R. E. HELLMUND.
SYSTEM OF CONTROL.
APPLICATION FILED AUG. 30, 1916.

1,320,052.

Patented Oct. 28, 1919.
7 SHEETS—SHEET 1.

WITNESSES:
R.J.Cidge.
W.R.Coley

INVENTOR
Rudolf E. Hellmund.
BY
Wesley G. Carr
ATTORNEY

R. E. HELLMUND.
SYSTEM OF CONTROL.
APPLICATION FILED AUG. 30, 1916.

1,320,052.

Patented Oct. 28, 1919.
2 SHEETS—SHEET 2.

WITNESSES:
R. J. Ridge.
W. R. Coley.

INVENTOR
Rudolf E. Hellmund.
BY
Wesley G. Carr
ATTORNEY

R. E. HELLMUND.
SYSTEM OF CONTROL.
APPLICATION FILED AUG. 30, 1916.

1,320,052.

Patented Oct. 28, 1919.
7 SHEETS—SHEET 3.

WITNESSES:

INVENTOR
Rudolf E. Hellmund.
BY
Wesley G. Carr
ATTORNEY

R. E. HELLMUND.
SYSTEM OF CONTROL.
APPLICATION FILED AUG. 30, 1916.

1,320,052.

Patented Oct. 28, 1919.
7 SHEETS—SHEET 4.

WITNESSES:
R. J. Cidge.
W. R. Coley

INVENTOR
Rudolf E. Hellmund.
BY
Wesley G. Carr
ATTORNEY

R. E. HELLMUND.
SYSTEM OF CONTROL.
APPLICATION FILED AUG. 30, 1916.

1,320,052.

Patented Oct. 28, 1919.
7 SHEETS—SHEET 7.

WITNESSES:
P. J. Ridge.
W. R. Coley

INVENTOR
Rudolf E. Hellmund.
BY
Wesley G. Carr
ATTORNEY

UNITED STATES PATENT OFFICE.

RUDOLF E. HELLMUND, OF SWISSVALE, PENNSYLVANIA, ASSIGNOR TO WESTINGHOUSE ELECTRIC AND MANUFACTURING COMPANY, A CORPORATION OF PENNSYLVANIA.

SYSTEM OF CONTROL.

1,320,052.      Specification of Letters Patent.     Patented Oct. 28, 1919.

Application filed August 30, 1916. Serial No. 117,643.

*To all whom it may concern:*

Be it known that I, RUDOLF E. HELLMUND, a subject of the German Emperor, and a resident of Swissvale, in the county of Allegheny and State of Pennsylvania, have invented a new and useful Improvement in Systems of Control, of which the following is a specification.

My invention relates to systems of control for electric railway motors and generators and the like and especially to the regenerative control of direct-current motors of the class indicated.

In regenerative systems employing auxiliary sources of energy for the main-machine field windings, such as an exciting armature of a motor-generator set, if the excitation of the motor generator set is proportional to, or dependent upon, the supply-circuit voltage, in case of a sudden decrease thereof, the excitation of the motor-generator set and, consequently, indirectly, of the main machine or machines, is correspondingly reduced, and the inherent tendency to regenerate excessive currents, which results from the decrease of supply-circuit voltage, will not last for any considerable length of time. However, since the main-machine field winding is inherently of relatively high induction and the field flux is damped by eddy currents in the frame, and since, therefore, the respective current and flux changes therein do not occur very rapidly, temporary overloads of the motor, with the resultant abnormal high voltage upon the commutator cylinder and consequent "flash-over" troubles, may occur.

The object of my present invention is to provide systems embodying relatively simple and effective means for overcoming the above-mentioned difficulty by temporarily varying the main-field-winding excitation more than proportionately to the concurrent fluctuation of supply-circuit voltage, thereby hastening the change of main-field-winding current to prevent "flash-over" conditions.

Viewed from another angle, it is the object of my present invention to provide means for inherently imparting a relatively steep speed-current characteristic to a regenerating machine, that is, to inherently effect a change of regenerative current that is proportionately greater than the concurrent variation of speed, and to further provide means, acting at a relatively slow rate, for neutralizing the current changes to a predetermined degree for effecting the desired and proper adjustment, or, in other words, to flatten out the above-mentioned speed-current characteristic to a certain extent, as more fully set forth hereinafter.

Considered from still another point of view, the object of the invention may be explained as follows: The above-mentioned relatively steep speed-current characteristic is desirable in order to protect the regenerating machine from excessive armature currents and "flash-over" difficulties under varying conditions of supply-circuit voltage and machine speed, as already set forth. However, the characteristic in question has the disadvantage that the machines and the associated vehicle are not properly protected from over-speeding, since the torque available, under increased-speed conditions, does not increase proportionately as much as the speed, or may even decrease. Consequently, it is desirable to modify the speed-current characteristic under consideration to the extent that, not only shall no sudden increases of current occur upon sudden variations of supply-circuit voltage, but, at the same time, an increased torque, or at least, a desirably heavy torque, shall be provided when the vehicle speed increases.

Various systems for accomplishing the foregoing objects to a greater or less degree will be hereinafter set forth.

My invention is best understood by reference to the accompanying drawings wherein.

Figure 1:
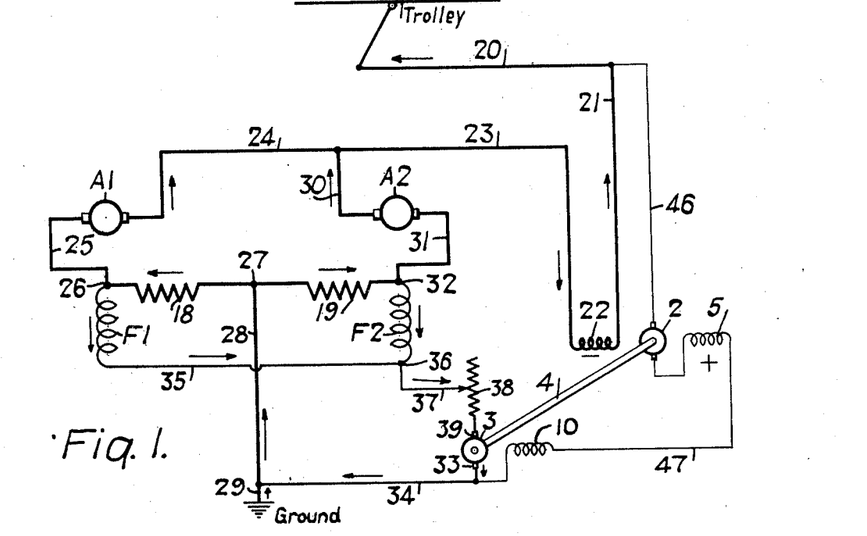
Figure 1 is a diagrammatic view of one set of main and auxiliary-machine circuits embodying my present invention.

Referring to Fig. 1 of the drawing, the system shown comprises a plurality of suitable supply-circuit conductors respectively marked "Trolley" and "Ground;" a plurality of main dynamo-electric machines respectively having armatures A1 and A2 and field-magnet windings F1 and F2 of the well-known series type; a plurality of main-circuit fixed resistors 18 and 19 for purposes to be described; and an auxiliary motor-generator set, or the like, embodying a driving armature 2 and a driven armature 3 that may be mechanically coupled in any suitable manner, as by a shaft 4.

The auxiliary driving armature 2 is provided with a series-related field winding 5 and a second field winding 22 that is adapted to be energized in accordance with the regenerated current. The auxiliary driven generating armature 3 is connected to energize the main field windings F1 and F2, in accordance with circuits to be traced, during the regenerative period. A field winding 10 for the generator armature 3 is connected in series relation with the auxiliary motor armature 2, as hereinafter fully described.

Inasmuch as the particular switching or control devices that are employed for making the various illustrated connections and for inaugurating regenerative operation are immaterial to my present invention, I have not deemed it necessary to illustrate any such devices. It will be understood that any suitable means for accomplishing the desired connections may be utilized, and I will describe the various systems only in so far as is necessary to obtain a complete understanding of my present invention.

Figure 5:
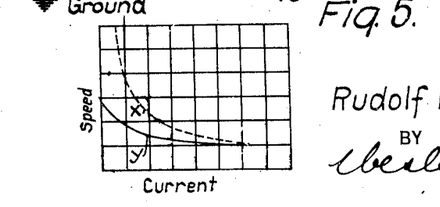
Fig. 5 is a curve chart serving to illustrate certain operating characteristics of some of the illustrated systems.

The main-circuit resistors 18 and 19 are chosen of fixed value that will impart to the regenerating machines a relatively steep speed-current characteristic as indicated by the dotted curve X in Fig. 5, that is to say, a relatively slight change in vehicle speed during the regenerative period would tend to produce a relatively small change of regenerated current if the action of the resistors 18 and 19 were not counteracted by a certain performance of the auxiliary motor-generator set, as about to be described.

The main regenerative circuit is established from the trolley through conductors 20 and 21, a field winding 22 for the auxiliary motor armature 2 that is negatively or differentially connected with respect to the series field winding 5 therefor, as indicated by the minus and plus signs, respectively, and conductor 23 to the parallel-related main machines, one circuit including conductor 24, main armature A1, conductor 25, junction-point 26, and main-circuit resistor 18 to junction-point 27, and the other circuit including conductor 30, main armature A2, conductor 31, junction-point 32 and resistor 19 to the junction-point 27, whence a common circuit is completed through conductors 28 and 29 to the negative conductor Ground.

The circuit of the auxiliary generating armature 3 is established from one terminal 33 thereof through conductors 34 and 28 to the junction-point 27, where the circuit divides, one branch including resistor 18, main field winding F1, and conductor 35 to junction-point 36, and the other branch including resistor 19, main field winding F2 and junction-point 36, whence circuit is completed through conductor 37 and variable resistor 38 to the other terminal 39 of the auxiliary armature 3.

As indicated by the arrows, the main armature or regenerated current and the exciting current from the auxiliary armature 3 traverse each of the main-circuit resistors 18 and 19 in the same respective direction. Thus, upon an incipient increase of regenerated current in the armature A1, for example, the voltage across the corresponding main-circuit resistor 18 is immediately increased, thereby accordingly reducing the exciting voltage that is impressed upon the main field winding F1 to cause the regenerated current to again assume its normal value. The converse action takes place upon a decrease of regenerated current in either main armature. By reason of this "negative compound" characteristic of the main machine during the regenerative period, the regenerated current is inherently maintained substantially constant.

The main-circuit operation just described is not of my present invention, but is fully set forth and claimed in my co-pending application, Serial No. 44,443 filed August 9, 1915 patented April 1, 1919, No. 1,298,706.

The auxiliary motor circuit is completed from the positively-energized conductor 20 through conductor 46 the armature 2 and the series field winding 5 of the auxiliary motor, conductor 47, field winding 10 for the auxiliary exciting armature 3 and conductor 34 to the negative supply-circuit conductor Ground.

Assuming that the circuit connections are as illustrated and that regenerative operation has been begun in any well-known manner, upon a sudden reduction, for example, of supply-circuit voltage, the previously-mentioned action of the main-circuit resistors 18 and 19 will tend to impart the above-recited steep speed-current characteristic to the regenerating machines and, consequently, the main-field-winding excitation will be momentarily varied more than proportionately to the supply-circuit voltage fluctuation in question. However, the negative or differential effect of the regenerated-current-excited field winding 22 for the auxiliary motor armature 2, after a short time interval, will decrease the effective excitation of the armature 2 and, therefore, cause the motor-generator set to accordingly increase in speed.

The design of parts is such that the speed increase just mentioned and the resultant rise of the voltage generated by the exciting armature 3 will just compensate for the excess of reduction of main field-winding excitation that was effected by the main-circuit resistors 18 and 19, or in other words, will sufficiently neutralize such action after a short time interval to properly excite the main field windings, so that the entire system is suitably adjusted to compensate for the supply-circuit-voltage fluctuation under consideration.

The action of the main-circuit resistors 18 and 19 is thus very rapid, while the action of the differentially related field winding 22 for the driving-motor armature 2 lags behind by reason of an effect similar to mechanical inertia. Graphically considered, the action of the differential field winding 22 is to flatten out the previously mentioned steep speed-current characteristic of the regenerating machine, as indicated by the solid line curve Y of Fig. 5, which, therefore, corresponds to the normal operation of the system.

Figure 2:
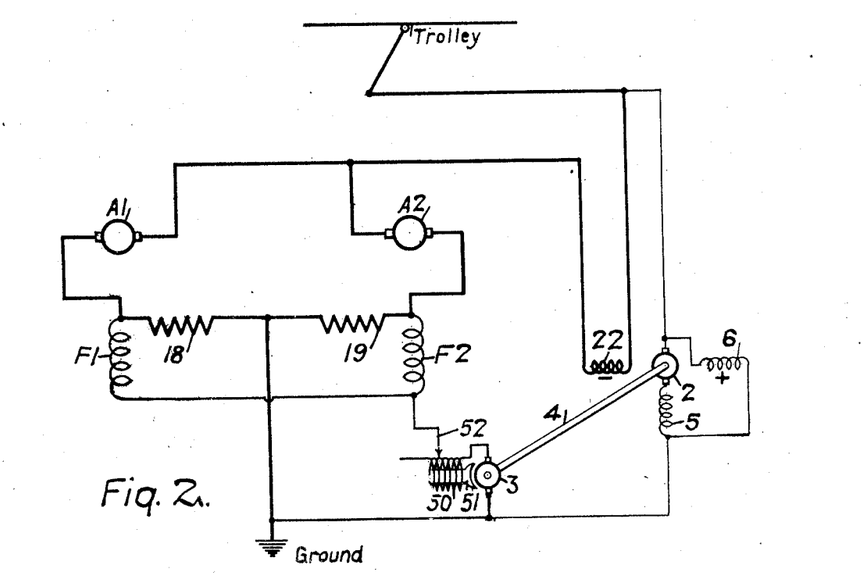
Fig. 2 to Fig. 4, inclusive, are similar diagrammatic views of modifications of the system that is shown in Fig. 1.

In Fig. 2, the system illustrated comprises the supply-circuit conductors and the main-machine circuits as shown in Fig. 1, and an auxiliary motor-generator set which embodies the mechanically-connected armature windings 2 and 3 together with the series or compensating field winding 5, a shunt-connected field winding 6 and the regenerated-current-excited field winding 22 for the motor armature 2. Also a series-related variable field winding 50 is provided for the auxiliary generator armature 3, and is wound upon a suitable laminated field structure, indicated by the polar projection 51, for the purpose of rendering the exciting flux of the field winding rapidly susceptible to changes of current traversing it. If desired, the active number of turns in the field winding 50 may be varied by means of a suitable switching device 52.

The field winding 50 thus takes the place of the variable resistor 38 that is shown in Fig. 1, but, otherwise, the circuits of the auxiliary exciting armature 3 are identical.

Assuming that the connections are as illustrated and that regenerative operation has been inaugurated in any suitable manner, the operation of the system, under conditions of supply-circuit voltage fluctuation, is very similar to that set forth in connection with Fig. 1. However, the laminated field structure 51 of the field winding 50 for the auxiliary armature winding 3, by means of its relatively rapid flux-varying action with respect to the changes of current traversing the winding, serves to further accentuate the regulating action of the main-circuit resistors 18 and 19.

Moreover, in addition to thus imparting a relatively steep speed-current characteristic to the regenerating main machines, the provision of the series-related field winding 50 for the auxiliary exciting armature 3 has the effect of maintaining a substantially constant ratio of the main field-winding current, that is, the current traversing the auxiliary field winding and armature in question, to the main armature or regenerated current, as fully set forth and claimed in a co-pending application of L. M. Perkins, Serial No. 88,788, filed Apr. 4, 1916, patented Apr. 15, 1919, No. 1,300,293 and assigned to the Westinghouse Electric & Manufacturing Company.

However, the previously described negative or differential action of the regenerated-current-excited field winding 22 for the auxiliary motor armature 2, after a short time interval, serves to flatten out the speed-current characteristic of the machines, or, in other words, to properly adjust the main field-winding excitation, after the relatively rapid over-regulating action of the main-circuit resistors 18 and 19 and the auxiliary field winding 50.

As will be understood, the highly inductive properties of the auxiliary shunt field winding 6 will tend to increase the time interval in question.

Figure 3:
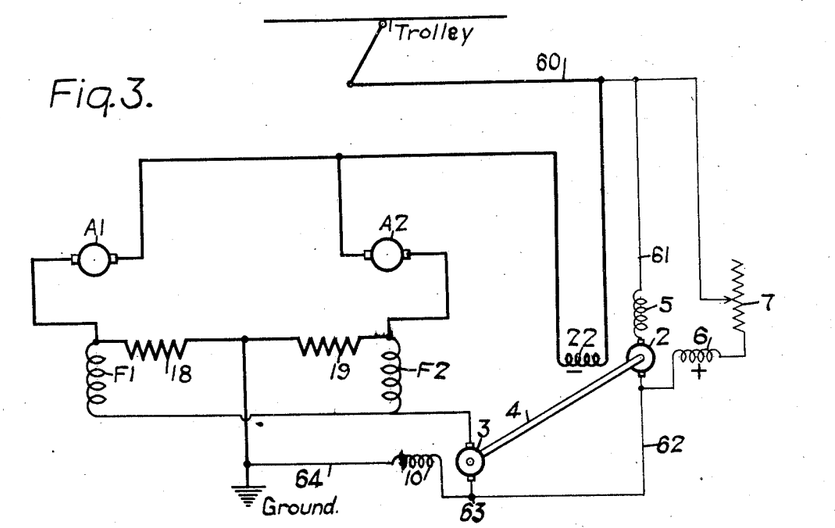

Referring now to Fig. 3, the system illustrated differs from that shown in Fig. 2, only in that the variable resistor 7 is included in circuit with the shunt field winding 6 for the auxiliary motor armature 2, and in that the field winding 10 is substituted for the field winding 50 for the auxiliary exciting armature 3 and is connected in series relation with the auxiliary motor armature 2 intermediate the exciting armature 3 and the negative supply-circuit conductor Ground, whereby the field winding 10 receives the current of both the auxiliary armatures 2 and 3.

The circuit of the auxiliary driving motor is completed from the trolley through conductors 60 and 61, the series field winding 5, the auxiliary armature 2, conductor 62, junction-point 63, to which the auxiliary exciting armature 3 is also connected, the field winding 10 for the armature 3 and conductor 64 to the negative conductor Ground.

Consequently, provision is made for exciting the field winding 10 in the proper direction whenever the motor-generator set is started into operation and thus it is insured that the voltage of the exciting armature 3 is built up rapidly and in the proper direction.

Figure 4:
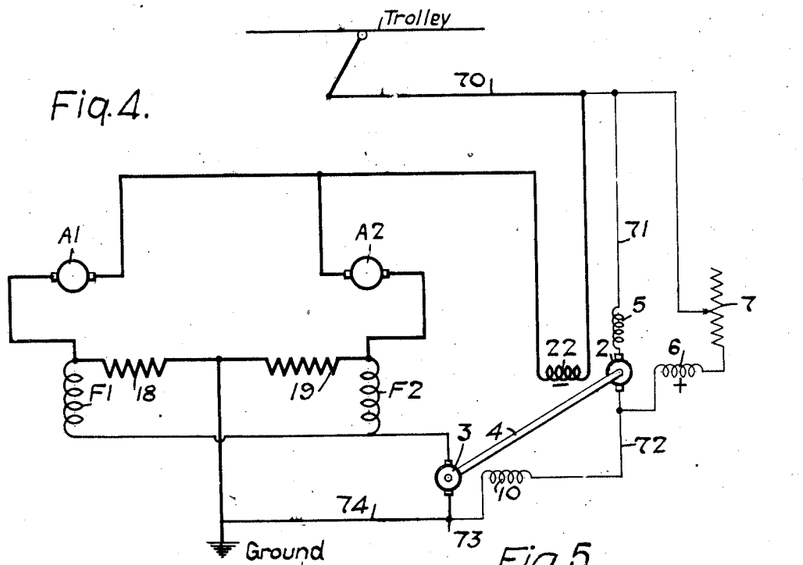

With reference to Fig. 4, the only differences in circuit connections from the system shown in Fig. 1 reside in the omission of the variable resistor 38 from the circuit of the auxiliary exciting armature 3 and the substitution therefor of the auxiliary variable resistor 7 that is connected in circuit with the shunt field winding 6 for the driving motor armature 2.

In this case also, the field winding excitation of the auxiliary exciting armature 3 is built up rapidly in the proper direction when the motor-generator set is started into operation and, however, the operating advantages, under conditions of supply-circuit voltage fluctuations that were set forth in connection with the system that is shown in Fig. 1 are thus combined with further desirable operating characteristics. Inasmuch as the operation in question will be readily understood by those skilled in the art, from the previous description with respect to the other figures, it is not deemed necessary to further set forth such operation.

Figure 6:
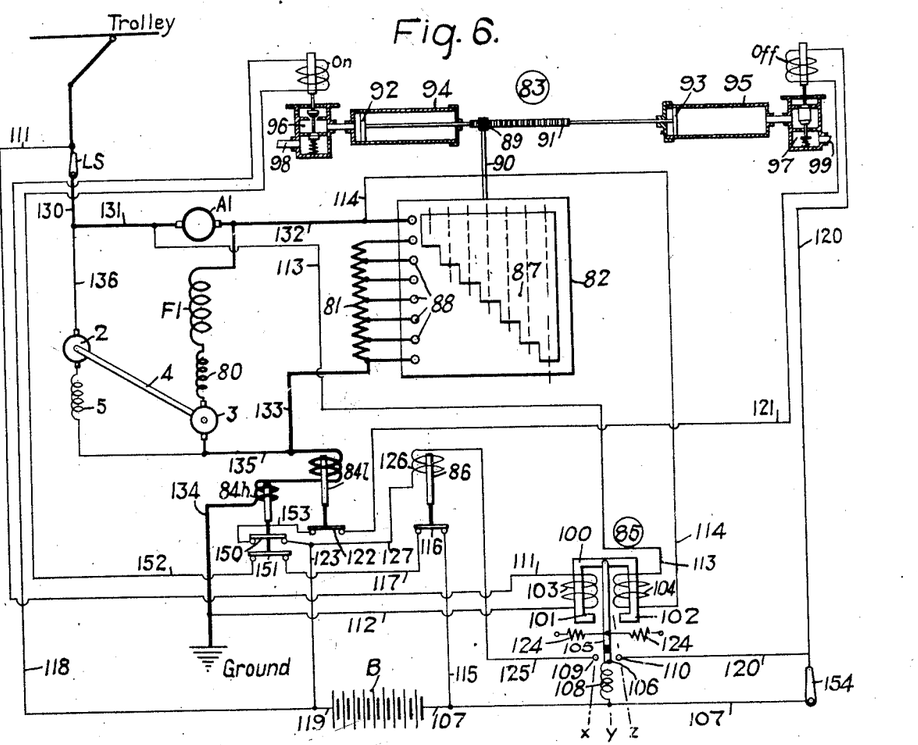
Fig. 6 to Fig. 16 are further modified systems arranged in accordance with the principles of my invention.

Reference may now be had to Fig. 6, wherein the system shown comprises the supply-circuit conductors, a main dynamo-electric machine and an auxiliary motor-generator set similar to those previously described and, in addition, a line switch LS of any suitable type; a main-circuit resistor 81 which is adapted to be short-circuited in sections in accordance with the operation of a control drum 82 that is governed by an actuating mechanism 83; a low-current limit switch 84$l$ and a high-current limit switch 84$h$ for partially controlling the action of the acuating device 83, as set forth in detail later; a three-position relay device 85 and a solenoid-type relay device 86 for operating in conjunction with the two limit switches to automatically govern the operation of the actuating device 83 during the regenerative period; and an auxiliary source of energy such as a battery B, for the various actuating coils.

The control drum 82 is provided with a movable contact member 87 of suitable configuration for successively engaging a plurality of control fingers 88 to gradually short-circuit the main-circuit resistor 81, thus compensating for the decrease of vehicle speed during the regenerative period.

The actuating mechanism 83 for the control drum 82 comprises a pinion 89 which is rigidly secured to one end of the operating shaft 90 of the control drum and is adapted to mesh with a horizontally-movable rack member 91, to the respective ends of which a pair of pistons 92 and 93 are secured to travel within operating cylinders 94 and 95. A pair of dissimilar valve members 96 and 97 are associated with the respective cylinders 94 and 95 to admit fluid pressure thereto from any suitable source (not shown) through pipes or passages 98 and 99, under predetermined conditions to be set forth. The valve members 96 and 97 are provided with actuating coils that are respectively marked "On" and "Off" and are controlled in a manner to be set forth later.

The mechanical operation of the actuating mechanism 83, without regard to the electrical connections effected by the movement thereof, may be set forth as follows: Under normal conditions, as illustrated, the valve member 97 is held open, whereas the other valve member 96 is maintained closed, whereby fluid pressure is admitted to the cylinder 95 to bias the piston member to the position shown. To effect forward movement of the actuating mechanism, the coils "On" and "Off" are simultaneously energized, whereby fluid pressure is admitted to the cylinder 94 through the valve member 96 and is exhausted from the cylinder 95 through the other valve member 97. This reversal of the initial unbalanced fluid-pressure conditions causes a movement of the actuating device in the desired direction. Such movement may be arrested at any time by merely deënergizing the "off" coil, whereupon balanced fluid-pressure conditions obtain in the cylinders 94 and 95 and thus a positive and reliable stoppage of the controlling device is effected.

To return the piston member to the illustrated position, the actuating coils "On" and "Off" are simultaneously deënergized, and the consequent reversion of unbalanced fluid-pressure conditions to the original state effects the desired actuation of the control drum.

The low-current limit switch 84$l$ is adapted to interrupt the circuit of the actuating coil "Off" when the regenerated current exceeds a certain value, thus temporarily halting the movement of the controller 82; whereas the high-current limit switch 84$h$ is adapted to interrupt the circuits of both the "off" and the "on" coils whenever an undesirably high regenerated current obtains, whereby the controller 82 is returned toward its "off" position. Thus, the main-circuit resistor 81 is automatically varied by the limit switches during the regenerative period to maintain the current between the desired values.

The three-position relay device 85 comprises a magnetizable core member 100 of substantially inverted U-shape that is provided with a pair of oppositely disposed arms 101 and 102 upon which energizing coils 103 and 104 are suitably wound. A freely swinging arm 105 is pivotally mounted upon the upper portion of the core member 100 to be actuated in the one or the other direction in accordance with the relative strengths of the actuating coils 103 and 104. The oscillatable arm 105 normally occupies its intermediate position $y$, by virtue of suitable centering springs 124 and is adapted to assume an extreme left hand or right-hand position $x$ or $z$, respectively, under the above-mentioned unbalanced magnetic conditions, to effect the engagement of a contact member 106 that is insulatedly secured to the swinging arm 105, with stationary contact members 109 and 110. The contact member 106 is positively energized through the agency of a conductor 107 that is connected to the positive terminal of the battery B and a flexible conductor 108 which is directly attached to the movable contact member 106.

One terminal of the energizing coil 103 for the relay device 85 is connected through conductor 111 to the trolley, while the other terminal thereof is connected through conductor 112 to the negative supply-circuit conductor Ground. Thus the coil 103 has impressed upon it substantially the full supply-circuit voltage. The other energizing coil 104 has one terminal connected through conductor 113 to the higher-voltage terminal of the main armature A1, whereas the other terminal of the coil is connected, through conductor 114, to the lower-voltage terminal of the main armature. In this way, the energizing coil 104 receives, at all times, a voltage that is substantially equal to the voltage generated by the main armature A1.

The energizing circuit of the "on" actuating coil is normally completed, under operative regenerating conditions, from the positive terminal of the battery B, through conductors 107 and 115, coöperating stationary and movable contact members 116 of the relay device 86 in its lower position, conductor 117, contact members 151 of the high-current limit switch 84$h$ in its lower position, conductor 152, the actuating coil "On," and conductors 118 and 119 to the negative battery terminal.

During the regenerating period, the circuit of the "off" actuating coil is completed from the battery conductor 107 through a suitable switching device 154, conductor 120, the "off" coil, conductor 121, coöperating contact members 122 of the low-current limit switch 84$l$, conductor 153 coöperating contact members 150 of the high-current limit switch 84$h$, and conductors 123 and 119 to the negative battery terminal. The switching device 154, as well as, the line switch LS, is preferably controlled in a familiar manner by a master controller, which it is not believed necessary to show here. On the other hand, during the coasting period, when the switches LS and 154 are open, the circuit of the "off" actuating coil is open, since the circuit is dead-ended at the stationary contact member 110 of the three-position relay device 85 and at the switch 154.

Assuming that the main machine is operating under coasting conditions, that the three-position relay device 85 occupies its intermediate position $y$ and that, by reason of the vehicle traveling down a grade or because of a sudden decrease in the supply-circuit voltage, the machine voltage coil 104 of the relay device temporarily predominates over the other energizing coil 103, then the oscillatable arm 105 is attracted to its position $z$, whereupon a circuit is completed from the positively-energized movable contact member 106, through the stationary contact member 110, conductor 120, the actuating coil "Off" of the mechanism 83, conductor 121, coöperating contact members 122 of the limit switch 84 in its lower position, and conductors 123 and 119 to the negative battery terminal.

The two actuating coils "On" and "Off" of the mechanism 83 being thus simultaneously energized, movement of the control drum 82 in a forward direction to gradually short-circuit more of the main-circuit resistor 81 is thus effected and, therefore, the generated voltage of the main machine is correspondingly reduced, since the resistor 81 is also included in circuit with the main field winding F1, as previously described. When the magnetic conditions in the two arms of the three-position relay device 85 are again balanced, that is, when the supply-circuit voltage and the generated main armature voltage are again substantially equal, the oscillatable arm 105 will return to its neutral position $y$ to interrupt the circuit of the "off" actuating coil and, therefore, effect a stoppage of the control drum 82 in the proper position.

On the other hand, if the supply-circuit voltage coil 103 of the relay device 85 temporarily becomes stronger than the other energizing coil 104, by reason of the vehicle traveling up a grade or because of a sudden increase of supply-circuit voltage, the oscillatable arm 105 is actuated to its position $x$. Under such conditions, the positively-energized movable contact member 106 engages the stationary contact member 109, whence circuit is continued through conductor 125, actuating coil 126 of the relay device 86 and conductors 127, 123 and 119, to the negative battery terminal. The relay device 86 is thus raised to its upper or inoperative position to interrupt the previously-traced circuit of the "on" actuating coil through the auxiliary contact members 116.

In this way, the above-mentioned original unbalanced fluid-pressure conditions in the cylinders 94 and 95 obtain, whereby the control drum 82 is moved toward its "off" position until the magnetic conditions in the three-position relay device 85 are again balanced, when the swinging arm 105 returns to its neutral position $y$ through the agency of the centering spring 124.

The three-position relay device 85 thus operates in conjunction with the relay device 86 to automatically maintain a substantially constant regenerated current, irrespective of track grades or supply-circuit voltage fluctuations, during the coasting period, thereby performing functions similar to those of the low-current and the high-current limit switches during the regenerative period. The relay device 85 forms no part of my present invention except in so far as it performs a desirable function in connection therewith, and is fully set forth and claimed in a co-pending application of A. J. Hall and L. M. Perkins, Serial No. 113,114 and filed August 4, 1916, and assigned to the Westinghouse Electric & Manufacturing Company.

Assuming that regenerative operation has been begun in any suitable manner, the main-circuit connections are completed from the trolley through the line switch LS, conductors 130 and 131, the main armature A1, conductor 132, certain control fingers 88 that engage the contact segment 87 of the control drum 82, the main-circuit register 81, conductor 133, the series actuating coil of the two limit switches and conductor 134 to the negative supply-circuit conductor Ground.

The exciting circuit of the auxiliary armature 3 is established from one terminal thereof through conductors 135 and 133, the main-circuit resistor 81, contact members of the control drum 82, as previously set forth, conductor 132, the main field winding F1, and field winding 80 for the auxiliary generating armature 3 to the other terminal of the armature. A further auxiliary circuit is completed from the positively-energized conductor 130 through conductor 136, the auxiliary driving armature 2 of the motor-generator set, the series field winding 5 therefor and conductor 135 to the negative conductor Ground, as already set forth.

Since the auxiliary driven armature 3 is provided with a series-related field winding 80, the combination thereof with the main-circuit resistor 81 produces a very desirable speed-current characteristic for avoiding "flash-over" troubles, as already pointed out with reference to a co-pending application of L. M. Perkins, Serial No. 88,788, filed April 4, 1916, patented Apr. 15, 1919, No. 1,300,293, the reason being that upon any change of supply-circuit voltage conditions, the speed of the motor-generator set cannot change instantaneously and, therefore, sudden current variations that produce an undesirable ratio of armature ampere-turns to field-winding ampere-turns are very effectively prevented. In the present case, however, since the driving armature 2 is also series-excited, the speed of the motor-generator set will change after a short time interval and, therefore, the speed-torque relations of the system can be very satisfactorily designed in accordance with the best all-around conditions for the safety of the vehicle and of the regenerative system. Moreover, the resistance losses in the main circuit resistor 81 can be maintained at a relatively low average since the resistor is not completely active for any length of time, but ordinarily only portions thereof are utilized.

By designing the field-magnet structure that is associated with the series-related field winding 5 for the driving armature 2, so that the degree of saturation therein is slightly more than the degree of saturation in the field-magnet structure corresponding to the series-related field winding 80 for the auxiliary generating armature 3, the previously mentioned speed-torque characteristic can be maintained relatively steep, that is to say, a desirable increase of torque occurs upon any increase of vehicle speed, even though the resistor 81 is maintained at a relatively low value. The reason for the last-recited action will be evident from the statement that under the conditions mentioned, the effect of the less highly saturated field-magnet structure for the field winding 80 will produce the desired variation of flux more rapidly than the flux is varied by the field winding 5 in its core-structure, which is more highly saturated. Thus, the relatively rapid over-compensating effect in the main field winding is produced to the desired degree and a subsequent adjustment of the motor-generator set, through the lagging action of the series-related field winding 5 for the auxiliary motor armature, to the new voltage conditions is effected.

Figure 7:
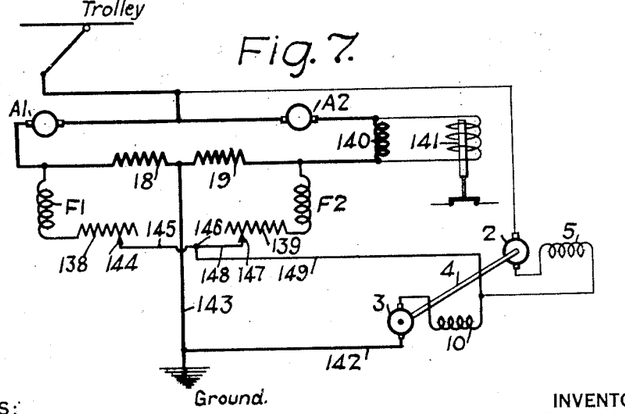

Referring now to Fig. 7, the system shown comprises the supply-circuit conductors, the parallel-related main machines, the fixed resistors 18 and 19, and the motor-generator set similar to the system shown in Fig. 1 and in addition, a plurality of variable resistors 138 and 139 that are respectively disposed in series relation with the main field winding F1 and F2, and an inductive device 140, which is associated with the actuating coil of a limit switch 141 that corresponds to the limit switch 84 of Fig. 6.

The circuit of the auxiliary driving armature 2 is established from the trolley through the armature, series-related field-magnet winding 5 therefor, the series-connected field winding 10 and the armature winding 3 of the auxiliary generator, and conductor 142 to the negative conductor Ground.

The circuit of the auxiliary generator armature 3 is completed from one terminal thereof through conductors 142 and 143 where the circuit divides, one branch including fixed resistor 18, main field winding F1, variable resistor 138 which may be changed in active circuit value through the agency of any suitable switching device 144, and conductor 145 to a junction-point 146, and the other branch including main-circuit resistor 19, main field winding F2, variable resistor 139, switching device 147 which corresponds to the switching device 144, and conductor 148 to the junction-point 146, whence common circuit is completed through conductor 149 and the field winding 10 to the opposite terminal of the auxiliary generator armature 3.

It will be observed that the chief differences of the system just outlined from the system of Fig. 6, outside of the fact that two main machines instead of one are employed, resides in the provision of variable resistors 138 and 139 in the main field-winding circuits while the fixed resistors 18 and 19 are utilized instead of the variable resistor 81 of Fig. 6. The connection of the series field winding 10 for the auxiliary generator armature 3 in series relation with the auxiliary motor armature 2 insures that the excitation of the generator armature 3 is always rapidly built up in the proper direction when the motor-generator set is started into action.

Since in the system shown, sudden increases of regenerated current are avoided, in some cases it may be difficult to make an ordinary series-excited current-limit switch for automatic deceleration properly respond. Under such conditions, the voltage-controlled limit switch 141 may be utilized in place of the current-limit switch 84 that is shown in Fig. 6 and the actuating coil thereof may be connected across the inductive device 140, whereby the magnified action of the regenerated current upon the actuating coil of the limit switch 141, by reason of the inductive effect of the device 140, will produce a sufficient variation of voltage to cause the desired operation of the limit switch.

Figure 8:
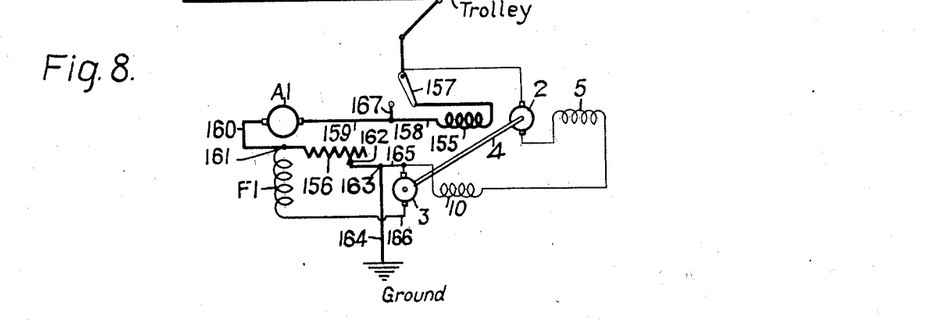

Referring to Fig. 8, the system shown comprises the supply-circuit conductors Trolley and Ground, the main dynamo-electric machine having the armature A1 and the field winding F1, a variable resistor 156 that is disposed in series relation with the armature A1 during the regenerative period, and a motor-generator set of a type similar to those hereinbefore described, but provided with a different arrangement of field windings.

The auxiliary motor armature 2 is excited through the agency of the series-related field winding 5 and a second field winding 155 that may be connected in circuit with the regenerating machine, in accordance with the position of a two-way switch 157, to aid the field winding 5, as set forth in detail later.

Assuming that regenerative operation has been inaugurated in any well-known manner, the main circuit is completed from the trolley through the switch 157 in its solid-line position, field winding 155 for the auxiliary motor armature 2, conductors 158 and 159, main armature A1, conductor 160, junction-point 161, the variable main-circuit resistor 156, a suitable switching device 162, junction-point 163 and conductor 164 to the negative supply-circuit conductor Ground.

The circuit of the auxiliary generator armature 3 is established from one terminal thereof through conductor 166, the main field winding F1, the variable resistor 156, switching device 162, junction-point 163, and conductor 165 to the other armature terminal.

The auxiliary motor circuit is established from the trolley through the driving motor armature 2, series-related field winding 5 therefor, and field winding 10 for the auxiliary generator armature 3 to junction-point 163, whence circuit is completed as already traced.

If it is desired to exclude the regenerated-current-excited field winding 155 for the auxiliary motor armature 2 from circuit, the switching device 157 may be actuated to its dotted-line position, whereby the main circuit is completed from the trolley through conductors 167 and 159 directly to the main armature A1.

The operation of the system just described under conditions of a sudden decrease, for example, of supply-circuit voltage, may be set forth as follows; the combined action of the field winding 10 for the auxiliary generator armature 3 and of the main-circuit resistor 156 to produce a certain relatively rapid over-compensation of the main field-winding excitation takes place as previously described in connection with the other system, and the series-related field winding 5 for the auxiliary motor armature 2, after a short time interval, tends to decrease such over compensation, as already set forth. However, the provision of the additional field flux from the re-generated-current-excited field winding 155 for the driving armature 2 tends to counteract such decreasing tendency and thus finally impart a speed-current characteristic to the regenerating machine that is not flattened out so much as would be the case if the series-related field winding 5 were employed alone.

From another point of view, therefore, the resistor 156 may be of relatively small value and the inherent regulating action thereof is supplemented to the proper degree by the action of the regenerated - current - excited field winding 155.

A further advantage of the system under consideration resides in the fact that the strength of the total field flux for the auxiliary motor armature 2, upon an increase of regenerated current, through the agency of the field winding 155 effects a corresponding reduction in the current traversing the auxiliary armature and, therefore, the field winding 10 for the auxiliary generator armature 3. Thus a relatively rapid temporary reduction of the voltage of the auxiliary generator armature is brought about. In the present system, the field-magnet structure for the series-related field winding 5 for the auxiliary motor armature 2 is preferably normally saturated to a higher degree than is the field-magnet structure that is associated with the field winding 10 for the auxiliary generator armature 3, for the purpose set forth in connection with Fig. 7.

Figure 9:
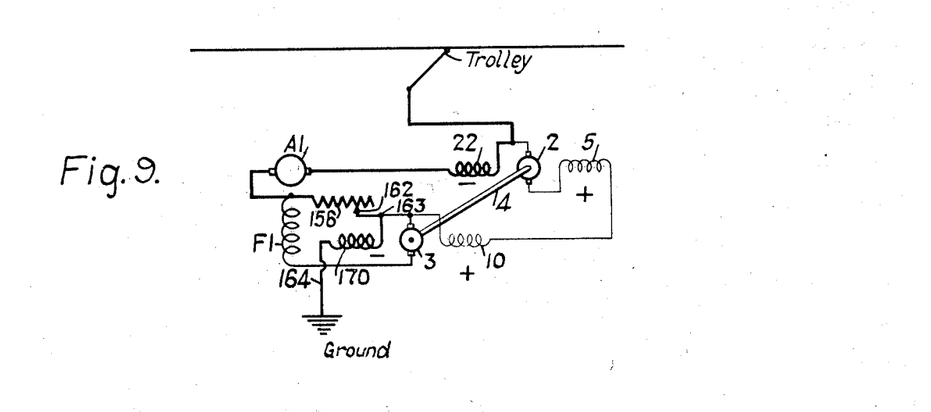

In Fig. 9 the only differences from the system just described reside in the provision of a regenerated-current-excited field winding 170 for the auxiliary generating armature 3 that is differentially disposed with respect to the field winding 10, as indicated by the positive and negative signs, and a differential connection of the regenerated-current-excited field winding 22 for the auxiliary motor armature 2, whereby the auxiliary driving motor is excited in a manner similar to that shown in Fig. 1.

Under regenerative conditions, the main circuit is completed from the trolley through the field winding 22 for the auxiliary motor armature 2, main armature A1, variable resistor 156, switching device 162, junction-point 163 and the differentially connected field winding 170 for the auxiliary generator armature 3 to the negative supply-circuit conductor Ground. The other circuits are identical with those described in connection with Fig. 8.

Upon a sudden increase of regenerated current by reason of a rapid decrease of supply-circuit voltage, for example, the effective flux for the auxiliary generator armature 3 is correspondingly reduced by reason of the differential relation of the field windings 170 and 10, whereby the main field-winding excitation is proportionately reduced and the supplementary action of the main-circuit resistor 156 produces the above-mentioned over-compensating effect. However, the concurrent reduction of current traversing the field winding 22 for the auxiliary motor armature 2, after a short interval, effects a corresponding decrease in the total field flux for the auxiliary armature, thereby causing an increased speed of the motor-generator set to adjust itself to the new conditions and thus effect a proportionate increase of the voltage supplied to the main field winding F1 by the auxiliary generator armature 3, thereby finally producing the proper excitation of the main field winding.

Figure 10:
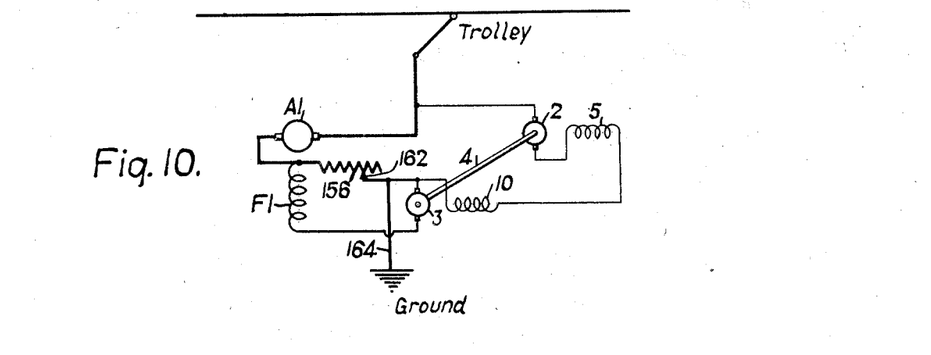

In Fig. 10 the regenerated-current-excited field windings 22 and 170 for the auxiliary motor armature 2 and generator armature 3, respectively, are omitted, but otherwise the system is identical to that shown in Fig. 9.

Under the assumed conditions of a sudden decrease of supply-circuit voltage, the current traversing the auxiliary motor armature 2 and the field winding 10 for the auxiliary generator armature 3 is correspondingly reduced at a certain rate, dependent upon the machine charactertics, and particularly if the damping or inductive effect of the field winding 5 is greater than such effect of the other auxiliary field winding 10. The desired over-compensating effect under the assumed conditions is thus produced by the main-circuit resistor 156 alone, and the motor-generator set subsequently modifies such action to the desired degree. In this case also the relative effect of the resistor 156 and the auxiliary field windings may be varied by producing different degrees of saturation in the field-magnet structures that are associated with the field windings 5 and 10, respectively, as previously set forth in connection with Fig. 7.

Figure 11:
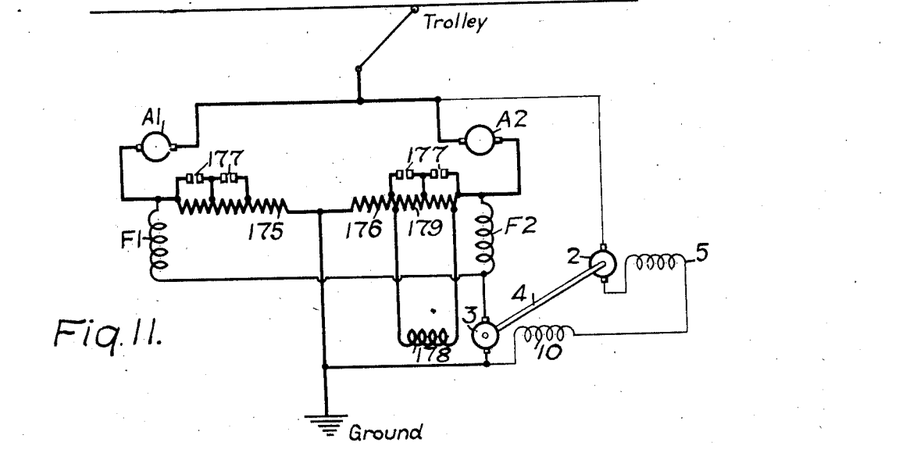

Referring to Fig. 11, the system shown comprises the supply-circuit conductors Trolley and Ground; the main dynamo-electric machines respectively having armatures A1 and A2 and field windings F1 and F2; a pair of main-circuit resistors 175 and 176, which may be varied in active circuit value through the agency of suitable switches 177 and which are connected in series relation with the respective main armatures in a manner similar to previously described systems; and an auxiliary motor-generator set embodying the armatures 2 and 3, the field windings 5 and 10 therefor, and a second field winding 178 for the auxiliary generator armature 3 that is energized from the portion 179 of the main-circuit resistor 176 that is adapted to be short-circuited by the combined action of the switches 177.

Assuming that the regenerative operation of the system is being effected in a normal manner and that the supply-circuit voltage suddenly decreases the main-circuit resistors 175 and 176 will inherently tend to produce the above-mentioned negative compound action to a degree determined by the value of the resistor with respect to the remaining parts of the system, as previously explained. If such decrease in the supply circuit voltage is of short duration only, the action of the resistors automatically prevents excessive armature currents and produces no really objectionable results otherwise, since the vehicle does not have time enough to increase in speed appreciable even though the braking torque is temporarily diminished.

However, if the above-mentioned low-voltage condition exists for a longer interval, the effect of the increased current traversing the main-circuit resistors will accordingly augment the voltage that is impressed upon the field winding 178 for the auxiliary generator armature 3, and since the field windings 178 and 10 are adapted to act cumulatively, the consequent increased voltage of the generator armature 3 will produce a corresponding increase of excitation of the main field windings F1 and F2. Such effect, however, will take place only after a certain lapse of time, since the highly self-inductive effect of the field winding 178 will prevent magnetizing currents therein from growing rapidly. Thus, the previously mentioned rapid over-compensating effect and the subsequent modification of such effect to the proper degree to produce suitable main field-winding excitation under the changed voltage conditions, is inherently produced.

Consequently, the vehicle either smoothly adjusts its speed to the changed supply-circuit voltage conditions without any undesirable current surges, or sufficient time is provided to allow the action of any relays that may be employed to adjust circuit connections. Such relay devices may be of the well-known limit switch type, wherein the actuating coil is connected in series-relation with the main machine, or preferably may be actuated in accordance with the torque produced by the main machines, that is to say, may be energized in accordance with the main armature current and the main field-winding voltage, for example. Inasmuch as such relay devices *per se* are old and familiar in the art, no further description thereof in the present connection is believed to be necessary.

The illustrated connection of the field winding 178 for the auxiliary generator armature winding 3, provides for the active operation of the field winding only under relatively high-speed regenerative conditions when the switches 177 are open and when, therefore, the voltage drop across the portion 179 of the resistor 176 assumes a material value. As the vehicle speed decreases during the regenerative period and the switches 177 are gradually closed to compensate therefor, the effect of the field winding 178 is gradually reduced at a corresponding rate until such effect is substantially *nil*. The reason for such connection is that only during the high-speed portions of the regenerative period is the system liable to operate in accordance with undesirably steep speed-current characteristics whereas, under lower-speed conditions, the corresponding portion of the speed-current curve is usually relatively flat so that the necessary compensation may be effected without the additional field winding 178.

It will be understood that the values of the selected portion 179 of the resistor 176 will be chosen in accordance with the particular operating characteristics desired; and moreover, under certain circumstances, it will be found advantageous to substitute for the resistor 176 an impedance device that comprises a highly inductive portion, whereby the speed-current curves are flattened, and a relatively non-inductive portion, the field winding 178 being connected across the non-inductive resistance portion.

Figure 12:
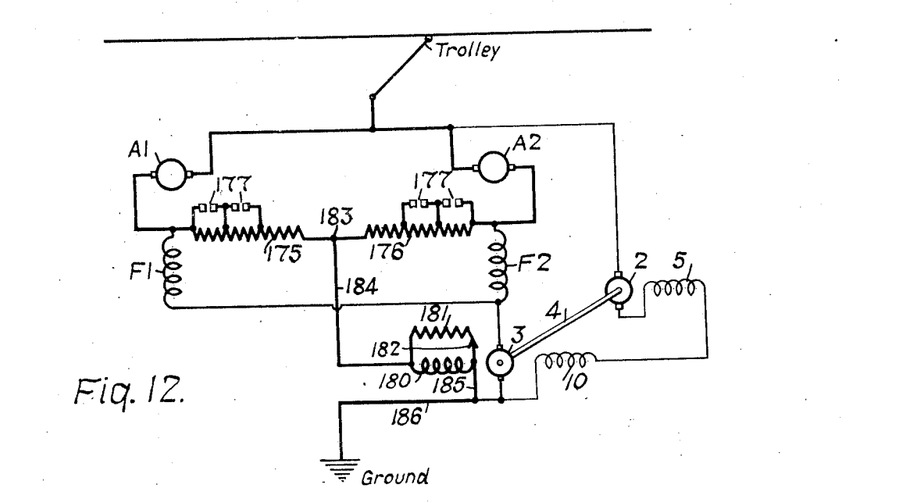

In Fig. 12, the only variation from the system that is illustrated in Fig. 11 resides in the substitution for the auxiliary field winding 178 of a field winding 180 that is connected in the main-machine circuit and that is shunted by a resistor 181, the active value of which may be varied by a suitable switching device 182. The purpose of the resistor 181 is to render the action of the field winding 180 relatively sluggish, since current changes rapidly take place in the resistor 181, but will be followed more slowly in the field winding 180 by reason of the relatively high inductive effect thereof.

The main-circuit connection in the present system is established from the trolley through the main armatures A1 and A2 and the main-circuit resistors 175 and 176, as was the case in the system that is shown in Fig. 11, to a junction-point 183, whence circuit is completed through conductor 184, the parallel-related field winding 180 and resistor 181, and conductors 185 and 186 to the negative supply-circuit conductor ground.

The circuit of the auxiliary generator armature 3 also includes the field winding 180 and the resistor 181, whereby the parallel circuit in question receives the sum of the regenerated and exciting armature currents.

Under the assumed conditions of a sudden reduction of supply-circuit voltage, the combined action of the resistors 175 and 176 and the field winding 10 for the auxiliary generator armature 3 produces the above-mentioned over-compensating effect with respect to the main field-winding excitation. After a short time interval, the regulating effect of the sluggishly-acting field winding 180 reaches its maximum value whereby the over-compensating effect is modified to the desired degree, for the purpose previously set forth.

In view of the previously-described operation of the systems that are shown in Fig.

9 and Fig. 12, which relate to a differential connection of the field windings for the auxiliary generator armature and to the above-mentioned sluggish action of one of the field windings, respectively, it is not believed that any further description of the operation of the system outlined is necessary.

Figure 13:
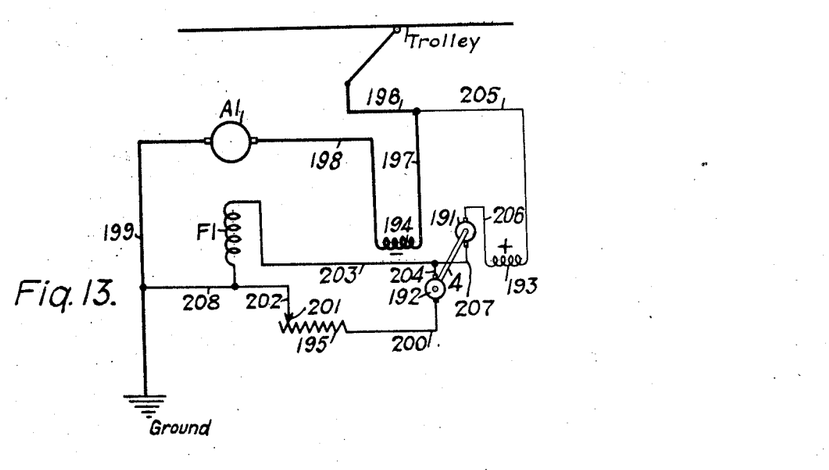

Referring now to Fig. 13, the system shown comprises the supply-circuit conductors Trolley and Ground and the main armature A1, together with the main field winding F1, as previously set forth, and, in addition, a dynamotor of a familiar type that may be utilized in place of the above described motor-generator sets, and a variable resistor 195.

The dynamotor comprises a motor or driving armature winding 191 and a generator or driven armature winding 192, that are preferably wound upon the same core member, which is mounted upon a shaft 4 in accordance with a familiar practice. A field winding 193 for the dynamotor is connected in series relation with the two armature windings, while a second field winding 194 is energized in accordance with the main-machine current, and is differentially disposed with respect to the other field winding 193.

It will be understood without extended description that the operation of the dynamotor in certain respects is more rapid and responsive to conditions than is the action of a similar motor-generator set, by reason of the common core member or magnetic circuit for the two armature windings, and this is particularly true if the field-magnet structure, as well as the armature core, is fully laminated. Moreover, the provision of a series-related field winding for the dynamotor tends to prevent the occurrence of "flash-over" difficulties therein, for the reasons previously set forth.

Assuming that regenerative operation has been begun in any suitable manner, the main-circuit connection is completed from the trolley through conductors 196 and 197, field winding 194 of the dynamotor, conductor 198, main armature A1 and conductor 199 to the negative conductor Ground.

The circuit of the dynamotor generating armature winding 192 is established from one terminal thereof through conductor 200, variable resistor 195, a suitable switching device 201 that is associated therewith, conductor 202, the main field winding F1 and conductors 203 and 204 to the other terminal of the armature winding 192.

A further auxiliary circuit is completed from the conductor 196, through conductor 205, the series-related field winding 193 of the dynamotor, conductor 206, the driving armature winding 191 of the dynamotor, conductor 207 and 204, the driven armature winding 192, conductor 200, variable resistor 195, switching device 201 and conductors 202 and 208 to the negative conductor Ground.

Under the assumed conditions of a sudden decrease of supply-circuit voltage, which results in a certain increase of regenerated current, for the reasons previously set forth, the excitation of the dynamotor from the regenerated-current-excited, field winding 194 is correspondingly augmented in a relatively rapid manner to produce the above-mentioned over-compensating or more than proportionate change in the main field-winding excitation. However, the speed of the dynamotor and the various currents traversing its component parts, will adjust themselves, after a short time interval, to the new conditions in such manner that the over-compensating effect in question is neutralized, to the desired degree and the resultant change of field-winding excitation is then substantially proportional to the corresponding supply-circuit voltage fluctuation.

Figure 14:
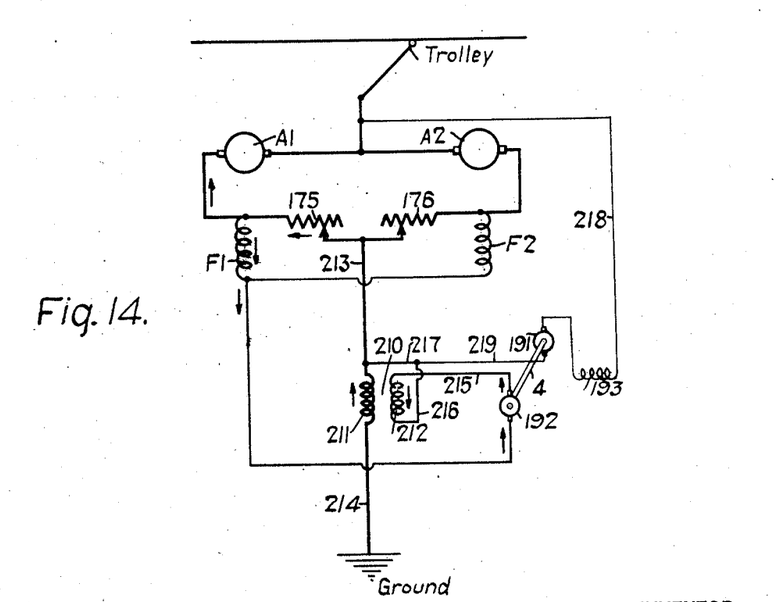

In Fig. 14, the system shown comprises the supply-circuit conductors, the main dynamo-electric machines and the variable main-circuit resistors 175 and 176, which produce the inherent negative compounding effect, as previously described, and, in addition, a dynamotor for main field-winding excitation purposes that corresponds to the dynamotor of Fig. 13 with the omission of the regenerated-current excited field winding 194; and a suitable transformer device 210.

The primary winding 211 of the transformer is connected to receive the main-machine currents, whereas the secondary winding 212 is connected in circuit with the generating dynamotor armature winding 192 and normally carries current in the opposite direction from the current traversing the primary transformer winding 211, as indicated by the arrows.

Under normal regenerative conditions, the main-machine circuits are completed from the trolley through the main armature and main-circuit resistors 175 and 176 as previously set forth, whence circuit is completed through conductor 213, the primary transformer winding 211 and conductor 214 to the negative conductor Ground.

A further circuit is completed from one terminal of the generating armature winding 192 through conductor 215, secondary transformer winding 212, conductors 216, 217 and 213, and thence through the respective resistors 175 and 176 and the corresponding main field windings F1 and F2 to the other terminal of the generating armature winding in accordance with circuits previously traced.

Another auxiliary circuit is established from the trolley through conductor 218, series-related field winding 193 and driving armature winding 191 of the dynamotor, conductors 219 and 217, the primary transformer winding 211 and conductor 214 to ground.

Upon a sudden decrease, for example, of the supply-circuit voltage during the regenerative period, the current traversing the primary transformer winding 211 correspondingly increases, which induces a voltage in the secondary transformer winding 212 that opposes the voltage of the generating armature winding 192 and thus effects a relatively rapid over-compensating of the voltage that is impressed upon the main field windings F1 and F2. The previously-mentioned time-element feature of the dynamotor with respect to adjusting itself to the new voltage conditions, then reduces the over-compensating effect that is produced in the manner just described, to the desired degree, in accordance with principles hereinbefore set forth.

Although in many cases "direct-current transformers" or induction coils that correspond to the transformer device 210 are not very effective because of being constructed without an iron core or with an iron core that rapidly becomes saturated, such will not be the case with the illustrated transformer because of the above-mentioned normally opposing action of the primary and secondary currents which therefore, produce a relatively small resultant magnetizing effect.

Figure 15:
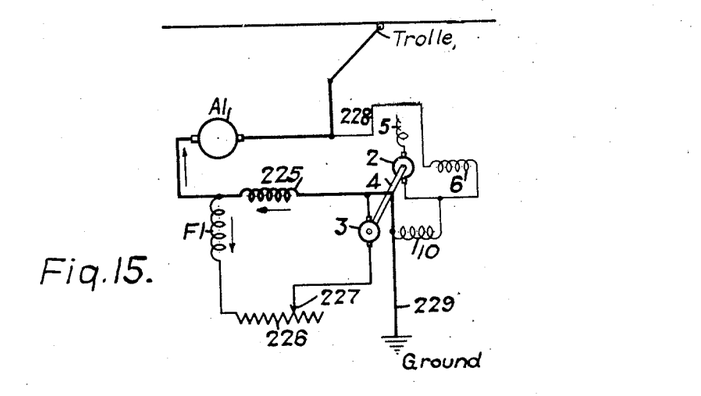

With reference to Fig. 15, the system shown comprises the supply-circuit conductors, a main machine, and an auxiliary-motor-generator set having armatures 2 and 3 and field windings 5, 6 and 10, as previously set forth, and in addition, a fixed inductive resistor 225 that is substituted for the fixed resistor 18 of Fig. 1, for example, and a variable resistor 226 that is included in circuit with the generator armature 3 and the main field winding F1.

The shunt field winding 6 for the auxiliary motor armature 2 is adapted to saturate the corresponding field-magnet structure (not shown) to a greater degree than the field-magnet structure that is associated with the auxiliary field winding 10 is saturated, as previously described in connection with Fig. 6.

The main-circuit connection during regenerative operation is established from the trolley through main armature A1, the inductive resistor 225 and thence to ground. The circuit of the generator armature 3 includes the inductive resistor 225, main field winding F1 and the variable resistor 226 with which is associated a suitable switching device 227. The auxiliary motor circuit is completed from the trolley through conductor 228, series-related field winding 5, auxiliary motor armature 2, field winding 10 for the armature winding 3, and conductor 229 to the negative supply-circuit conductor Ground.

Under the assumed conditions of a sudden decrease of supply-circuit voltage, the effect of the inductive resistor 225 and of the field winding 10 for the generator armature 3, is such as to produce the desired relatively rapid over-compensating effect upon the main field winding F1, in accordance with the principles more fully set forth in the description of Fig. 1. On the other hand, the relatively high saturation of the field-magnet structure that is associated with the shunt-connected field winding 6 for the auxiliary motor armature 2, imposes a certain lagging or time-element feature upon the operation of the motor-generator set, which results in the desired neutralization of the over-compensating effect after a short time interval.

Figure 16:
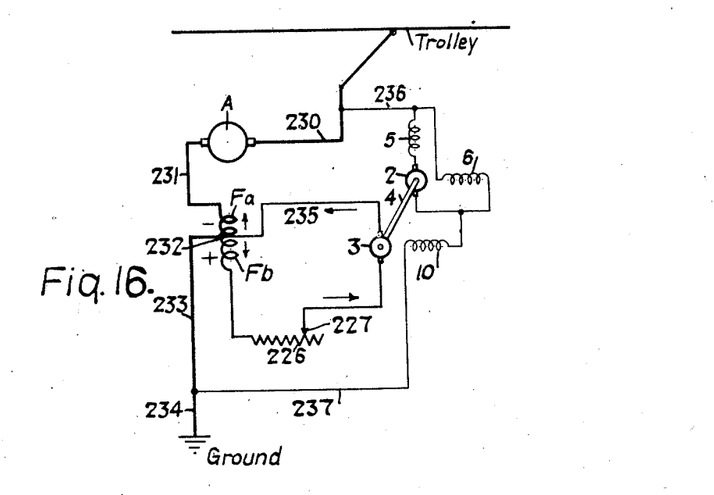

In Fig. 16, the system shown comprises the supply-circuit conductors Trolley and Ground, a motor-generator set, similar to that shown in Fig. 15, and a main dynamo-electric machine having an armature A and a field winding of the series type having a plurality of parts $Fa$ and $Fb$.

During the regenerative period the main circuit is established from the trolley through conductor 230 the main armature A, conductor 231, main field-winding portion $Fa$, junction-point 232, and conductors 233 and 234 to the negative conductor Ground.

The circuit of the auxiliary exciting armature 3 is established from one terminal thereof through conductor 235 junction point 232, main field-winding section $Fb$, through which current flows in the opposite direction from that traversing the main field winding $Fa$, as indicated by the arrows, variable resistor 226, and switching device 227 to the other terminal of the exciting armature.

The auxiliary driving motor circuit is established from the trolley through conductor 236, the series-related field winding 5, the armature 2, the field winding 10 for the exciting armature, 3, and conductors 237 and 234 to ground.

The previously mentioned negative compound effect that is produced by the inductive resistor 225 of Fig. 15, for example, is produced in the present system by reason of the differential relation of the main field-winding sections $Fa$ and $Fb$. For example, upon the above-mentioned decrease of supply-circuit voltage and the consequent increase of regenerated current, the effective main field-winding excitation will be correspondingly reduced in a relatively rapid manner by reason of the differential action of the main field-winding sections. The magnitude of the change in the main field-winding excitation will, of course, depend upon the design of the parts, but is preferably sufficient to produce a certain overcompensating effect, which is neutralized after a short time interval by reason of the adjustment of the motor-generator set to the new voltage conditions, the field-magnet structure that is associated with the shunt-connected field winding 6 for the auxiliary motor armature 2 being again highly saturated for the same purposes as set forth in the system of Fig. 15.

Obviously, further modifications of the hereinmentioned systems may be effected without departing from the spirit and scope of my invention, and it is my intention, therefore, to cover such modifications in the appended claims.

I claim as my invention:

1. In a system of control, the combination with a supply circuit and a dynamo-electric machine having an armature and a field winding, of a single exciter source for said field winding and means for inherently imparting a relatively steep speed-current characteristic to said machine and relatively slow-acting means for inherently tending to flatten said characteristic.

2. In a system of control, the combination with a supply circuit and a dynamo-electric machine having an armature and a field-winding, of a single exciter source for said field winding and means for inherently varying the field-winding excitation independently of said source more than proportionately to changes in supply-circuit voltage under predetermined conditions, and negatively-acting means for counter-acting said variations to a predetermined degree.

3. In a system of control, the combination with a supply circuit and a dynamo-electric machine having an armature and a field winding, of quick-acting means for inherently and momentarily varying the field-winding excitation more than proportionately to changes in supply-circuit voltage under regenerative conditions, and relatively slow-acting means for subsequently neutralizing said variations to the degree necessary to effect the proper adjustment.

4. In a system of control, the combination with a supply circuit and a dynamo-electric machine having an armature and a field winding, of a single exciting source for said field winding and resistance means in circuit with the main machine to effect momentary variations of field-winding excitation that are more than proportional to supply-circuit voltage fluctuations, and auxiliary dynamo-electric means for subsequently neutralizing said variations to a predetermined degree.

5. In a system of control, the combination with a supply circuit and a dynamo-electric machine having an armature and a field winding, of auxiliary dynamo-electric means for exciting said field winding, and resistance means in series relation with the main armature and in parallel relation to the main field winding to effect momentary variations of field-winding excitation that are more than proportional to the supply-circuit voltage fluctuations, the combined field windings in said auxiliary dynamo-electric means being adapted to create such joint fluxes as to effect a predetermined relatively slow-acting opposition to said variations.

6. In a system of control, the combination with a supply circuit and a main dynamo-electric machine having an armature and a field winding, of a dynamotor driven from said supply circuit for energizing said field winding and having a series-related field winding, and inductive means for temporarily decreasing the main-machine field strength upon an increase of main-armature current.

7. In a system of control, the combination with a supply circuit and a main dynamo-electric machine having an armature and a field winding, of a dynamotor having a series-related field winding and having its generating armature winding connected to energize the main field winding, and a transformer having its primary winding energized in accordance with the main-machine current and its secondary winding connected in circuit with said generating armature winding and in opposing relation to the primary winding.

8. In a system of control, the combination with a supply circuit and a main dynamo-electric machine having an armature and a field winding, of single means for exciting said field winding, means for normally decreasing the field strength upon an increase of main-armature current, and means for temporarily exaggerating such action.

9. In a system of control, the combination with a supply circuit and a main dynamo-electric machine having an armature and a field winding, of an auxiliary generating armature for exciting said field winding, a resistor connected in a common portion of the main-armature and exciting circuits to carry both currents in the same direction, and a transformer having its windings differentially disposed and respectively energized in accordance with the main-armature current and the exciting current.

In testimony whereof, I have hereunto subscribed my name this 25th day of August, 1916.

RUDOLF E. HELLMUND.